United States Patent
Elwin

(10) Patent No.: US 6,317,596 B1
(45) Date of Patent: Nov. 13, 2001

(54) ERROR DETECTING AND REPORTING SYSTEM IN A WIRELESS COMMUNICATION NETWORK

(75) Inventor: Randy Elwin, Cardiff by the Sea, CA (US)

(73) Assignee: Denso Corporation, Aichi-Ken (JP)

(*) Notice: Subject to any disclaimer, the term of this patent is extended or adjusted under 35 U.S.C. 154(b) by 0 days.

(21) Appl. No.: 09/175,236

(22) Filed: Oct. 20, 1998

(51) Int. Cl.$^7$ ........................................... H04Q 7/34
(52) U.S. Cl. .................. 455/423; 455/446; 455/67.1
(58) Field of Search .......................... 455/421, 423, 455/425, 474, 446, 456, 63, 65, 67.1, 406, 407, 67.4, 450, 703; 379/1, 27

(56) References Cited

U.S. PATENT DOCUMENTS

| | | | |
|---|---|---|---|
| 5,095,500 | * 3/1992 | Tayloe et al. ...................... | 455/446 |
| 5,442,679 | * 8/1995 | Regis et al. ........................ | 379/1 |
| 5,694,451 | * 12/1997 | Arinell .............................. | 455/67.1 |
| 5,884,163 | * 3/1999 | Hardouin ........................... | 455/423 |
| 6,088,588 | * 7/2000 | Osborne ............................ | 455/425 |

* cited by examiner

Primary Examiner—Lester G. Kincaid
(74) Attorney, Agent, or Firm—Fish & Richardson P.C.

(57) ABSTRACT

An error detecting and reporting system utilizes a subscriber terminal to monitor some aspect of communication link conditions while active on a call. The subscriber terminal includes a call state information detection mechanism. The mechanism monitors and saves the call state information leading to a link failure in a non-volatile memory. A processing unit sends the saved call state information to a system management entity when the link is re-established. The system management entity utilizes the call state information as part of a system performance activity by correlating the saved call state information with related system events to determine system problems.

12 Claims, 5 Drawing Sheets

| TERMINAL ERROR REPORT | |
|---|---|
| TIMESTAMP OF EVENT | 9:03:32 |
| ERROR TYPE | FRAME ERROR RATE EXCEEDED |
| ERROR STATE | ACTIVE |
| CS AREA REPORT TYPE | AVAILABLE AFTER DISCONNECT |
| CS A RECEPTION LEVEL | ID = 2   dB = 50 |
| CS B RECEPTION LEVEL | ID = 2   dB = 45 |

FIG. 4

ERROR DETECTING AND REPORTING SYSTEM IN A WIRELESS COMMUNICATION NETWORK

TECHNICAL FIELD

The invention relates to error detecting and reporting system in a wireless communication network, and more particularly, to error detecting and reporting system utilizing a subscriber terminal to monitor call state information leading to a link failure.

BACKGROUND

Wireless communication typically involves the transmission of information between a subscriber terminal 200, such as a cellular telephone or pager, and a cell station or base station. In such a communication system, the subscriber terminal 200 utilizes radio-frequencies ("rf") to communicate with relatively low-powered and limited-radiation coverage cell stations arranged in a cellular pattern. As a result, the wireless communication systems of this type are prone to call failures caused by bad coverage areas in the rf communications link.

In an indoor wireless system, there are number of sources of interference which may be encountered. For instance, for systems transmitting in the industrial and scientific band, around 2.4 GHz, interference may arise from other sources within the same band, like microwave ovens and security systems. For systems transmitting in the narrowband personal communication services, between 900 and 950 MHz, interference may be caused by barcode readers and child monitoring systems. For cordless telephones in 47 MHz band, random radio signals from other phones lead to spontaneous ringing and squawking noises. These interferences will eventually lead to undesirable link failures. In addition, coverage can be interrupted by rf shields, such as metal walls.

Determining the exact cause of such failure is often difficult as rf propagation characteristics vary greatly within a building. Predicting optimum cell station placement to prevent such problems has proven difficult. Predicting post-installation building modifications and user traffic patterns is similarly problematic. It has been suggested that an installation provide user problem reporting system. However, in practice, it has been found that users either provide unreliable information regarding rf coverage or neglect to accurately record failure conditions.

SUMMARY

Accordingly, it is desirable to provide a technique for automatically detecting a link failure at the subscriber terminal and automatically having the subscriber terminal send a report to the system management entity for evaluation of rf coverage problems.

The present disclosure describes an error detecting and reporting system in a wireless communication network. The error detecting and reporting system utilizes a subscriber terminal which monitors some aspect of communication link conditions while active on a call. The subscriber terminal includes a call state information detection mechanism. The mechanism monitors and saves the call state information leading to a link failure in a non-volatile memory. A processing unit sends the saved call state information to a system management entity when the link is re-established. The system management entity utilizes the call state information as part of a system performance activity by correlating the saved call state information with related system events to determine system problems.

In a preferred embodiment, the saved call state information includes a time stamp, link error types, link error states, area information and rf signal strengths. It uses area information and rf signal strengths in a triangulation method to determine the location of the problem coverage area. In a further embodiment, the system management entity processes the saved call state information in certain statistical way to generate visual display of error reports. In a further preferred embodiment, the call state information detection mechanism correlates the saved call state information with information from a Global Positioning System receiver unit to locate the problem coverage area.

Other embodiments and advantages will become apparent from the following description and from the claims.

BRIEF DESCRIPTION OF THE DRAWINGS

FIG. 4 is an example of an error report generated by the subscriber terminal.

Like reference numbers and designations in the various drawings indicate like elements.

DETAILED DESCRIPTION

A detailed description of a preferred embodiment is herein provided with respect to the figures.

Figure 1:
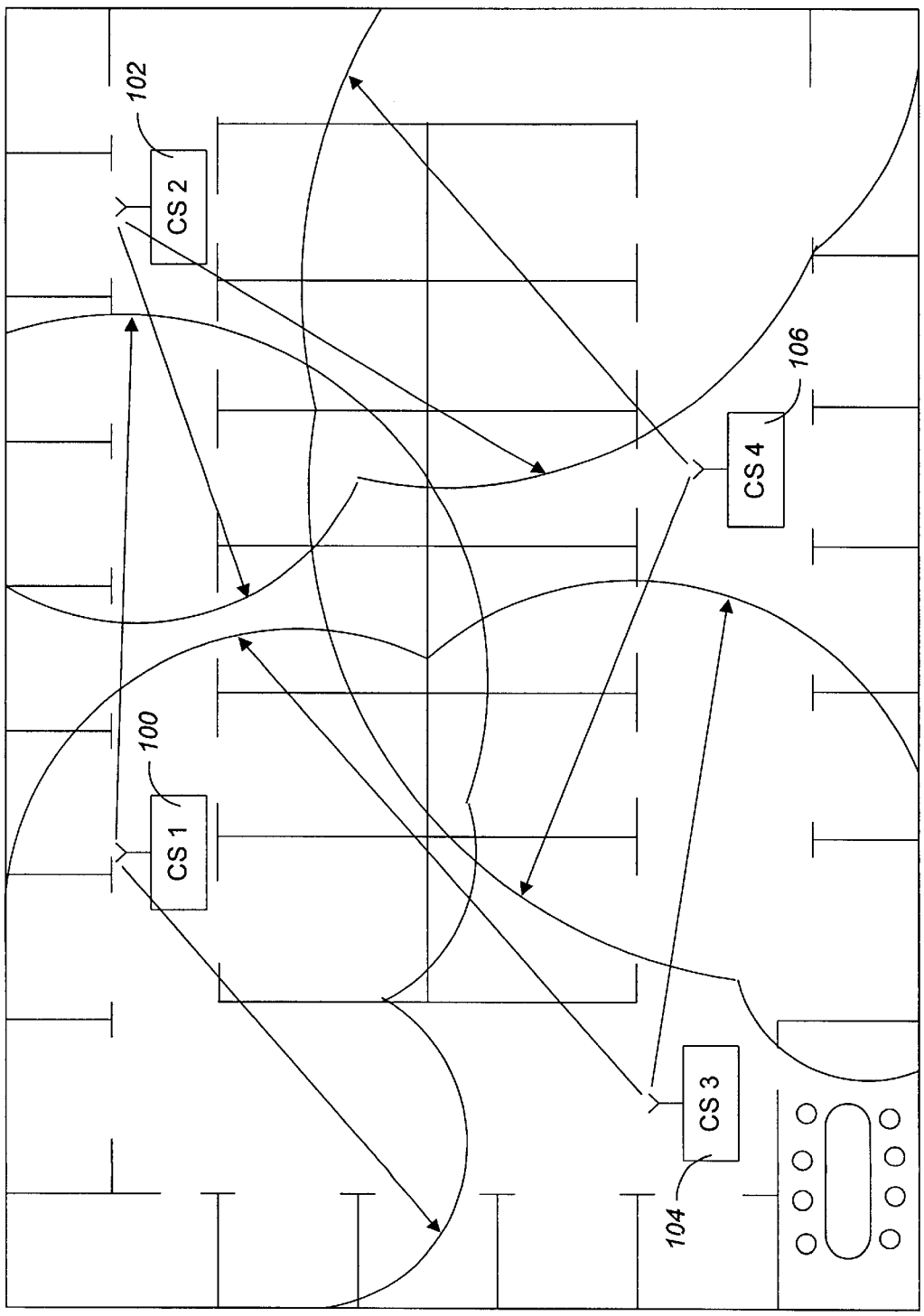
FIG. 1 is a diagram of an office floor with cell stations providing wireless telephony service.

FIG. 1 is a diagram of a typical office floor with cell stations providing wireless telephony service. The rf coverage of each of the four cell stations 100, 102, 104 and 106 is depicted by a heavy line. FIG. 1 shows that the coverage of the cell stations overlap each other. As mentioned above, a wireless communication system, such as the one depicted here, encounter different problems related to rf coverage, often leading to failures in certain areas.

Figure 2:
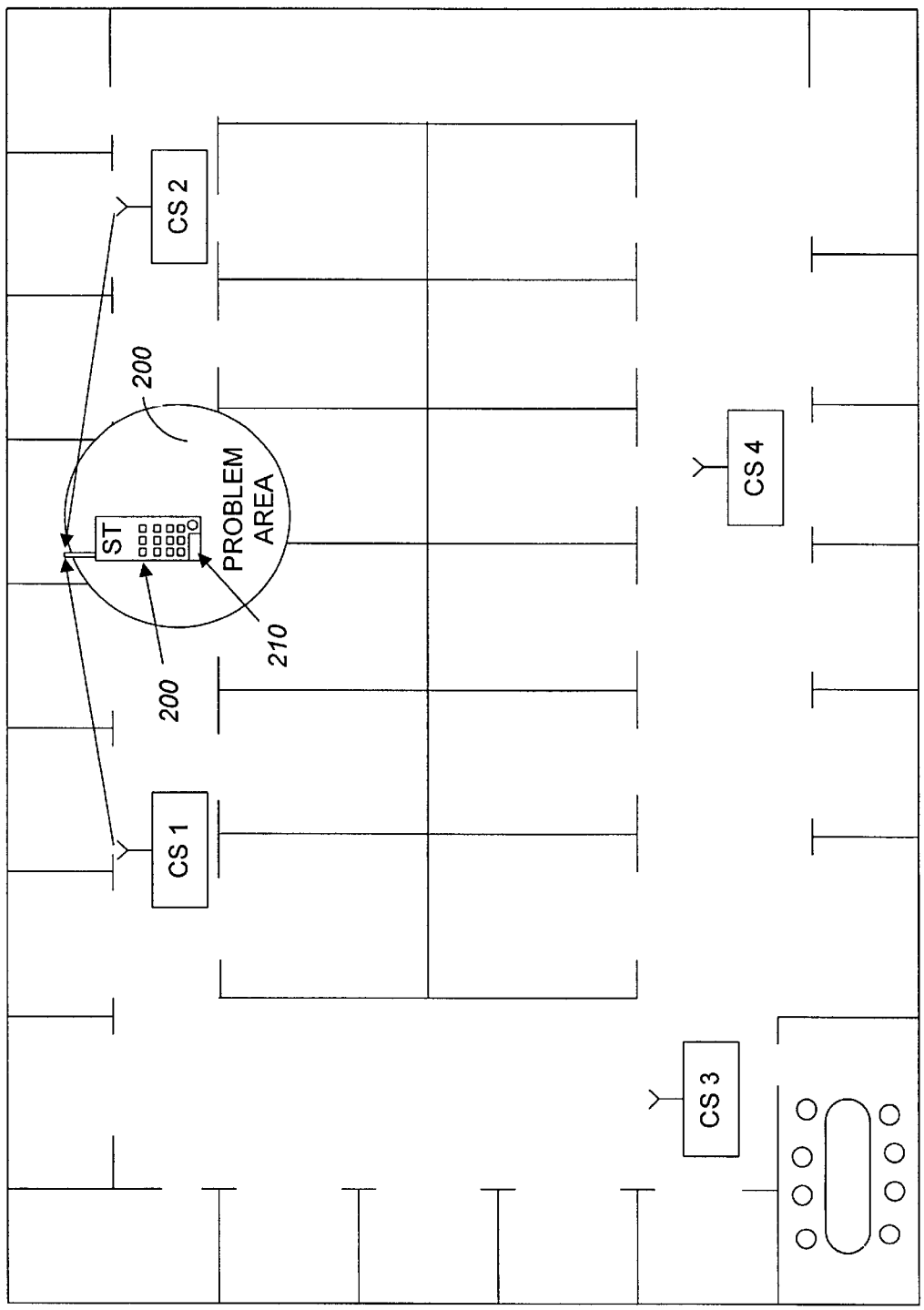
FIG. 2 shows a subscriber terminal in a reception problem area where an rf reception quality is poor or susceptible to interference.

A subscriber terminal can be a cordless telephone in the 47 MHz band, a narrowband personal communication system in 900 MHz band, or digital cellular service in 870 to 895 MHz band. FIG. 2 shows the subscriber terminal 202 in a reception problem area 200. This problem area 200 is one where rf reception quality is poor or susceptible to interference. The extent and bounds of the problem area 200 are unknown. Knowing these values accurately could enable some countermeasure actions to be taken.

According to a particular embodiment, the subscriber terminal 202 includes a call state information detection mechanism 210. The mechanism 210 includes means for determining and saving information regarding the link failure. The call state information can include a time stamp, link error types, link error states, area information and rf signal strengths.

The time stamp uniquely identifies a link failure and allows a system management entity to assess the extent and frequency of a particular link error type. The time stamp also allows the system management entity to perform certain statistical analysis based on reports from several subscriber terminals and correlate the result with related system events to determine system problems. For example, this enables determining if the outage exists at some times but not at others. Such intermittent failures are often otherwise difficult to determine. The link error types, the link error states, the area information and rf signal strengths provide the system management entity with a link failure condition report sufficient to pin point the problem area and determine the cause of failure. The location of the problem area 202 can be determined by a triangulation method or a Global Positioning System receiver unit. The area information may include relevant information related to a particular cell station and its performance within a problem area. The subscriber terminal 202 saves its call state information for each cell station broadcast channel.

Figure 3:
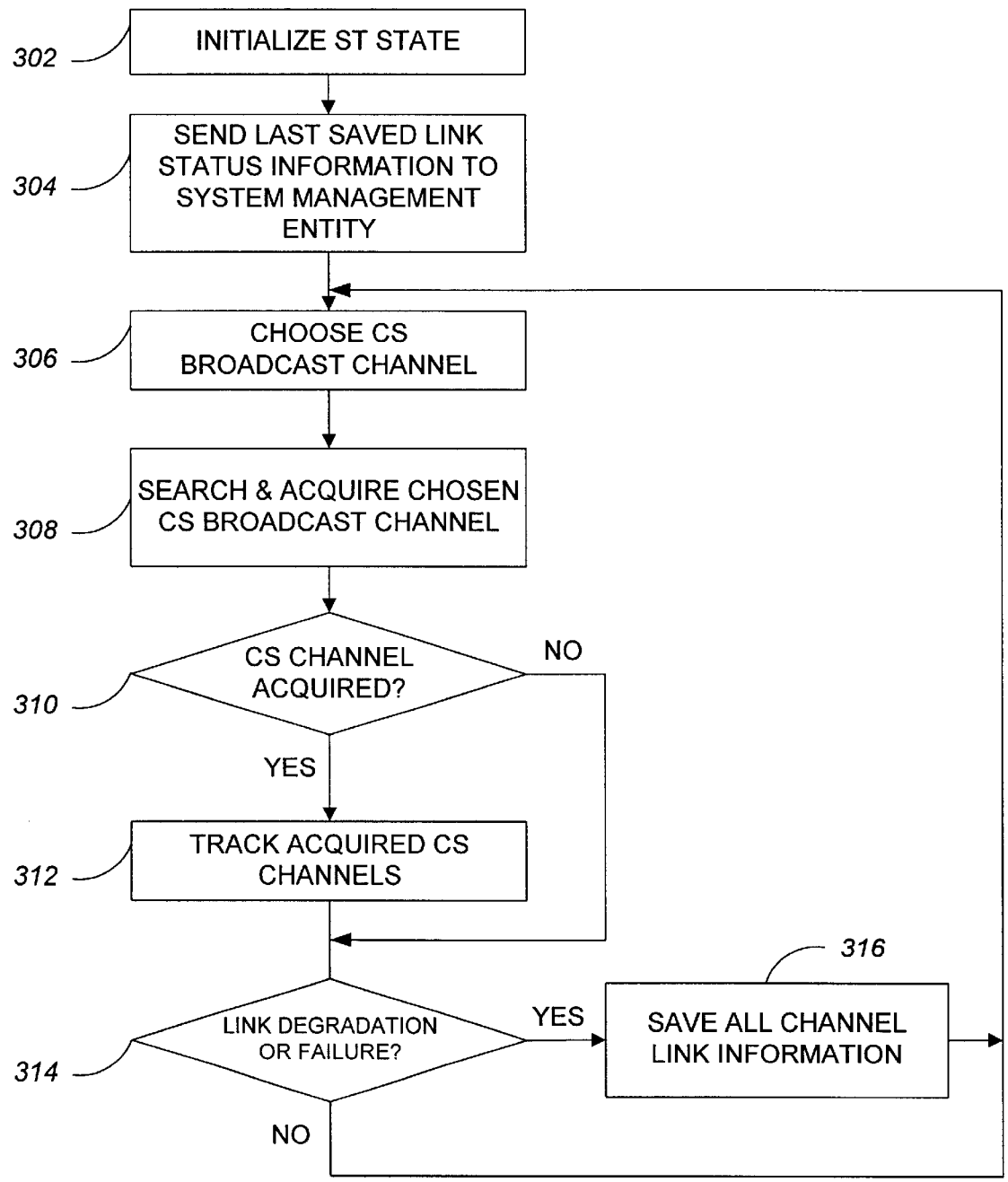
FIG. 3 is a flowchart for the operation of an error detecting and reporting system in a subscriber terminal as it enters/leaves a coverage problem area.

FIG. 3 is a flowchart showing the operation of an error detecting and reporting system within the call state information detection mechanism 210 of the subscriber terminal as it enters or leaves the problem coverage area 200. The subscriber terminal 202, upon turn on, initializes its own state at step 302. The error detecting and reporting system then sends the last saved link status information to the system management entity at step 304. Next, the subscriber terminal chooses, at step 306, a broadcast channel to search and acquire at step 308. If a cell station channel is acquired at 310, the subscriber terminal 202 tracks that channel at 312. Otherwise, the subscriber terminal 202 checks for link degradation or failure at 314. The link degradation is detected when an rf signal strength falls below a certain threshold.

The link failure is declared when rf signal strengths for all nearby cell station broadcast channels fall below the threshold. If the subscriber terminal 202 cannot perform cell station broadcast channel sampling due to severe interference or lack of signal strength, the error detecting and reporting system saves all channel link information at 316. The next time the subscriber attempts a call, the subscriber terminal 202 sends an additional message to the system management entity at 304. The message contains information pertinent to the previous call failure. An example message format is shown in FIG. 4.

Figure 5:
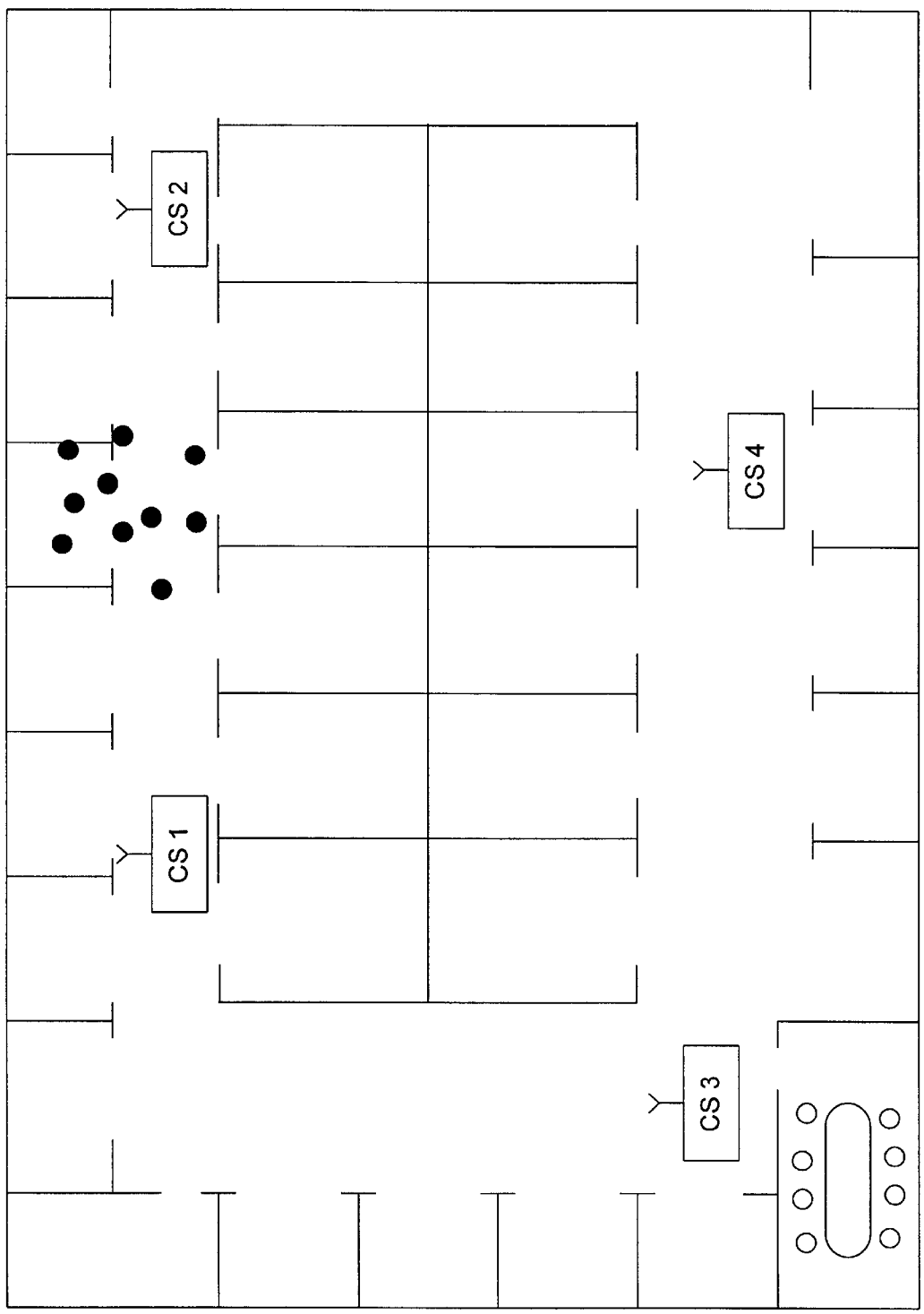
FIG. 5 is an example of a visual method to display cumulative error report locations.

The system management entity can process these error messages in various ways. FIG. 5 is an example of a visual method to display cumulative error report locations. This type of presentation helps service personnel determine where to investigate coverage problems.

This invention has been described in terms of particular embodiments. Other embodiments are within the scope of the following claims. For example, the steps of the invention can be performed in a different order and still achieve desirable results. Also, the system management entity can process the error messages in many different ways, including other visual methods of report.

What is claimed is:

1. A method for error detecting and reporting in a wireless communication network comprising:

(a) communicating using a subscriber terminal which monitors some aspect of communication link conditions while active on a call;

(b) saving call state information leading to a link failure in a problem coverage area, said call state information including time information related to said link failure; and (c) instructing the subscriber terminal to send the saved call state information, including said time information, to a system management entity upon subsequent communication link re-establishment, where the system management entity performs certain statistical analysis based on said time information.

2. The method of error detecting and reporting of claim 1, further comprising:

(a) utilizing the saved call state information as part of a system performance activity; and (b) correlating the saved call state information with related system events to determine system problems.

3. The method of error detecting and reporting of claim 1, wherein the saved call state information includes a time stamp, link error types, link error states, area information and radio frequency (RF) signal strengths.

4. The method of error detecting and reporting of claim 3, further comprising using area information and rf signal strengths to determine the location of the problem coverage area.

5. The method of error detecting and reporting of claim 2, further comprising:

(a) processing saved call state information; and (b) generating visual display of error reports.

6. A method for error detecting and reporting in a wireless communication network system comprising:

(a) communicating using a subscriber terminal which monitors some aspect of communication link conditions while active on a call;

(b) saving call state information leading to a link failure in a problem coverage area, said call state information including time information related to said link failure;

(c) instructing the subscriber terminal to send the saved information, including said time information, to a system management entity upon subsequent communication link re-establishment;

(d) utilizing the saved call state information as part of a system performance activity; and (e) correlating the saved call state information with related system events to determine system problems, where the system management entity performs certain statistical analysis based on said time information.

7. The method of error detecting and reporting of claim 6, wherein the saved call state information includes a time stamp, link error types, link error states, area information and radio frequency (RF) signal strengths.

8. The method of error detecting and reporting of claim 7, further comprising using area information and rf signal strengths to determine the location of the problem coverage area.

9. An error detecting and reporting system in a wireless communication network comprising:

(a) a subscriber terminal, said subscriber terminal including a call state information detection mechanism which monitors some aspect of communication link conditions while the subscriber terminal is active on a call;

(b) a non-volatile memory which holds the saved call state information leading to a link failure in a problem coverage area, said call state information including time information related to said link failure; and (c) a processing unit which determines when to send the saved call state information, including said time information, to a system management entity, where the system management entity performs certain statistical analysis based on said time information.

10. The error detecting and reporting system of claim 9, wherein the saved call state information includes a time stamp, link error types, link error states, area information and rf signal strengths.

11. The error detecting and reporting system of claim 9, further comprising:

(a) a system management entity which processes call state information sent by the subscriber terminals; and (b) a central processing unit which analyzes and correlates various information received from the subscriber terminals with related system events.

12. The error detecting and reporting system of claim 11, further comprising a visual display system to visually display the generated information from the central processing unit.

* * * * *